(12) United States Patent
Katz et al.

(10) Patent No.: US 9,130,445 B1
(45) Date of Patent: Sep. 8, 2015

(54) ELECTROMECHANICAL TRANSDUCER WITH NON-CIRCULAR VOICE COIL

(71) Applicants: David Micah Katz, Surrey (GB); Shelley Katz, East Sussex (GB)

(72) Inventors: David Micah Katz, Surrey (GB); Shelley Katz, East Sussex (GB)

( * ) Notice: Subject to any disclaimer, the term of this patent is extended or adjusted under 35 U.S.C. 154(b) by 0 days.

(21) Appl. No.: 14/451,047

(22) Filed: Aug. 4, 2014

(51) Int. Cl.
*H04R 25/00* (2006.01)
*H02K 41/035* (2006.01)
*H04R 9/02* (2006.01)

(52) U.S. Cl.
CPC ............ *H02K 41/0356* (2013.01); *H04R 9/025* (2013.01); *H04R 2209/022* (2013.01); *H04R 2209/041* (2013.01)

(58) Field of Classification Search
CPC ............... H02K 41/0356; H04R 9/025; H04R 2209/022; H04R 2209/041
USPC ......................................................... 381/421
See application file for complete search history.

(56) References Cited

U.S. PATENT DOCUMENTS

| | | | | |
|---|---|---|---|---|
| 3,674,946 | A * | 7/1972 | Winey | 381/408 |
| 5,216,723 | A * | 6/1993 | Froeschle et al. | 381/418 |
| 5,863,024 | A | 1/1999 | Blind et al. | |
| 6,208,743 | B1 * | 3/2001 | Marten et al. | 381/415 |
| 6,787,943 | B2 | 9/2004 | Godkin | |
| 7,142,687 | B2 * | 11/2006 | Hanada | 381/421 |
| 7,450,729 | B2 * | 11/2008 | Nguyen et al. | 381/152 |
| 7,912,240 | B2 | 3/2011 | Madaffari et al. | |
| 8,111,870 | B2 * | 2/2012 | Lemarquand et al. | 381/412 |
| 8,284,982 | B2 * | 10/2012 | Bailey | 381/401 |
| 2002/0030416 | A1 | 3/2002 | Jinupun | |
| 2002/0191808 | A1 * | 12/2002 | Croft et al. | 381/431 |
| 2007/0230737 | A1 * | 10/2007 | Hyde | 381/421 |
| 2013/0243239 | A1 * | 9/2013 | Zhao | 381/430 |
| 2014/0161303 | A1 * | 6/2014 | Kim | 381/401 |
| 2014/0233766 | A1 * | 8/2014 | Kim | 381/162 |

FOREIGN PATENT DOCUMENTS

| | | |
|---|---|---|
| EP | 1696693 A1 | 8/2006 |
| GB | 2489535 A | 10/2012 |
| JP | 5875999 A | 5/1983 |
| WO | WO 2005094120 A1 * 10/2005 | ............... H04R 9/02 |

OTHER PUBLICATIONS

English-language abstract of Japanese Patent Application Publication No. 5875999 A, 2 pages.

* cited by examiner

*Primary Examiner* — Paul McCord
(74) *Attorney, Agent, or Firm* — Sterne, Kessler, Goldstein & Fox P.L.L.C.

(57) ABSTRACT

Embodiments of an electromechanical transducer are presented. The electromechanical transducer includes a plurality of magnets and a substrate having a patterned conductive coil of at least one turn. The plurality of magnets are arranged such that a continuous magnetic flux path passes through each of the plurality of magnets. The substrate is located within an airgap between a given magnet of the plurality of magnets and an adjacent magnet of the plurality of magnets. The continuous magnetic flux path passes through at least a portion of the patterned conductive coil due to the location of the substrate within the airgap.

26 Claims, 19 Drawing Sheets

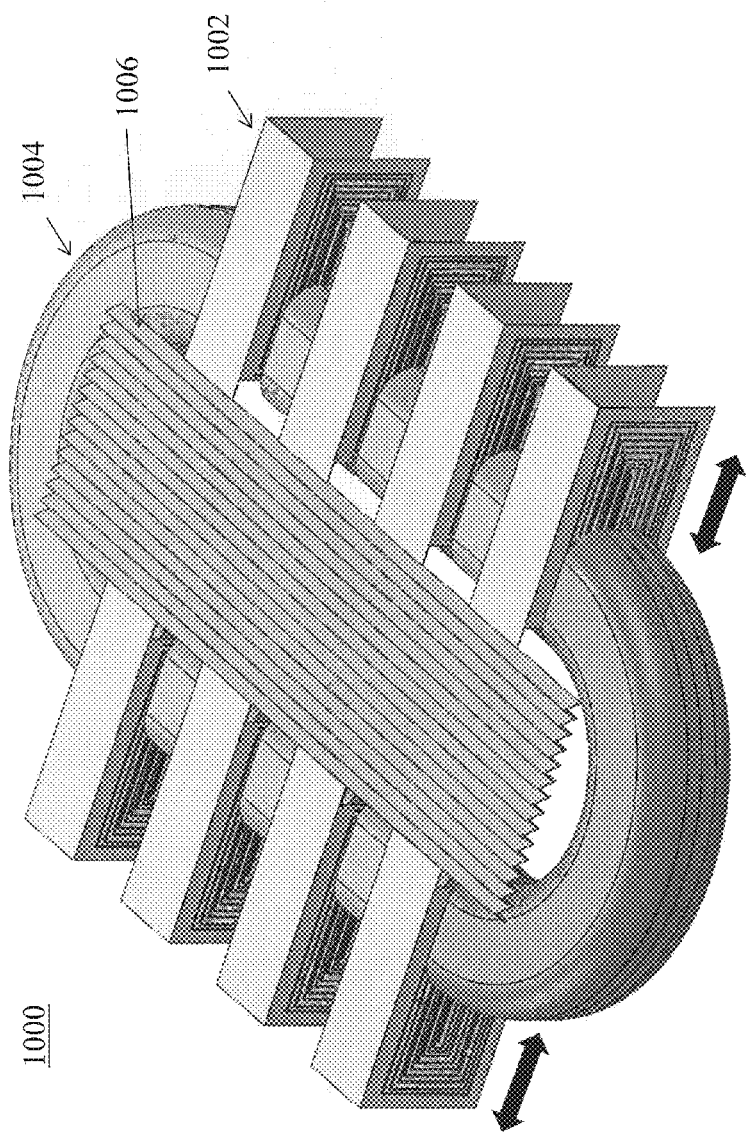

ELECTROMECHANICAL TRANSDUCER WITH NON-CIRCULAR VOICE COIL

FIELD

The field of the application relates to the design and operation of an electromechanical transducer using Lorentz forces to function as an actuator or as a sensor.

BACKGROUND

Electromechanical transducers have been widely used in the acoustic industry to vibrate the cone of a loudspeaker and generate desired sound frequencies. Such transducers rely on the Lorentz forces generated when a coil of wire conducting a current is subjected to a magnetic field. A derived version of Lorentz's law provides a relationship between the force, current, and magnetic field:

$$F=l(I \times B) \qquad (1)$$

Where F is the force, I is the current, l is the length of wire through which the current is flowing, and B is the magnetic field strength. Since the force vector is calculated as a cross product of the current vector and the magnetic field vector, the force vector will have a direction that is perpendicular to both the current direction and the magnetic field direction.

The coil of wire that conducts the current I and responds to the generated force when subjected to a magnetic field is commonly known as a voice coil in the field of audio engineering. Linear motor designs also often use the terminology of "voice coil" when describing the coil of current-carrying wire subjected to a magnetic field for the purpose of generating a force.

The voice coil is commonly wrapped in a circular direction and placed some distance away from a magnet with a given polarity, while an opposite polarity magnet is positioned somewhere on the outside of the wrapped coil. The magnetic field generated between the two opposite magnet polarities passes through the coil of wire and causes the voice coil to move up or down. This design is widely used for loudspeakers and other sound-generating devices. Although widely used and fairly inexpensive to manufacture, the amount of force that can be generated for a given current is limited.

SUMMARY

As devices continue to become smaller and power considerations increasingly drive the design, it is desirable to provide a transducer that can output greater forces with less driving current and/or reduced size.

According to an embodiment, an electromechanical transducer includes a plurality of magnets and a substrate having a patterned conductive coil of at least one turn. The plurality of magnets are arranged such that a continuous magnetic flux path passes through each of the plurality of magnets. The substrate is located within an airgap between a given magnet of the plurality of magnets and an adjacent magnet of the plurality of magnets. The continuous magnetic flux path passes through at least a portion of the patterned conductive coil due to the location of the substrate within the airgap.

According to another embodiment, an electromechanical transducer includes a plurality of magnets, a substrate having a patterned conductive coil of at least one turn, and a diaphragm. The plurality of magnets are spaced such that an airgap exists between adjacent ones of the plurality of magnets. The substrate is located within the airgap and the diaphragm is mechanically coupled to the substrate. The diaphragm lies in a plane that is substantially perpendicular to the substrate disposed within the airgap.

An example method is provided that includes arranging a plurality of magnets, generating a continuous magnetic flux path, and aligning one or more conductive coils patterned on a substrate. The one or more magnets are arranged such that an airgap exists between a given magnet and an adjacent magnet of the plurality of magnets. The continuous magnetic flux path passes through each of the plurality of magnets. The one or more conductive coils patterned on the substrate are aligned within respective airgaps such that the continuous magnetic flux path passes through at least a portion of the one or more conductive coils.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

FIGS. 10A-10B illustrate different views of an electromechanical transducer, according to embodiments.

Figure 1A:
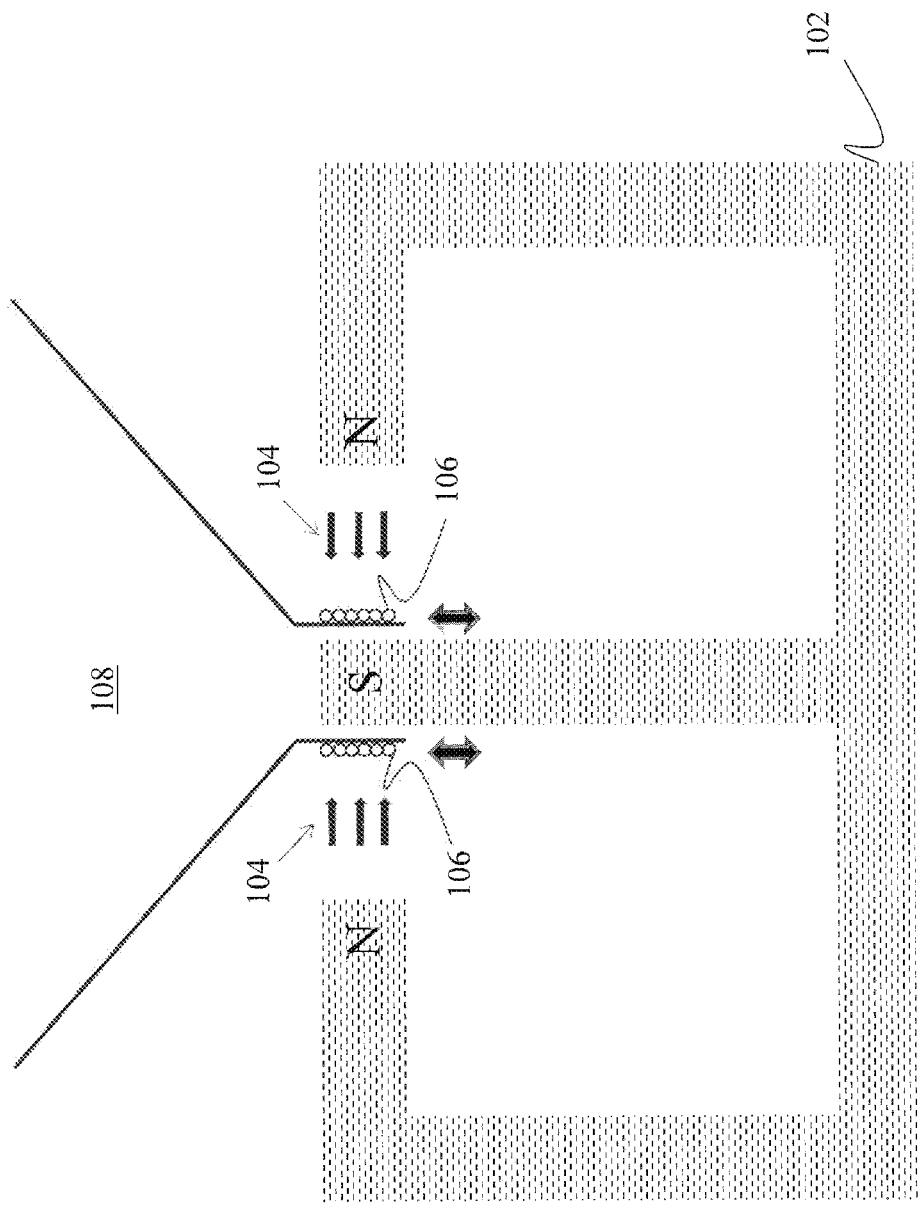
FIGS. 1A-1B illustrate examples of transducer designs using voice coils.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

GLOSSARY OF TERMS

Airgap: Volume of space that exists between two adjacent magnets.

Conductive coil: A conductive material arranged in a series of connected windings of at least one turn.

Conductive ink: Any conductive material that is deposited while in liquid, crystal suspension, or powder form and is cured to form a conductor.

Conductive polymer: Any polymer that conducts electricity.

Continuous magnetic flux path: A magnetic field generated between at least two magnets, where the path of the magnetic field does not terminate.

Corrugated material: Any flexible material having a non-flat cross section (e.g., sine wave, triangle wave, square wave).

Diaphragm: Any flexible material capable of vibrating in response to a force generated by the transducer.

Drive magnet: Any magnet that may be used to generate a magnetic field.

Electromagnet: A coil of wire wrapped around a ferromagnetic material, such that a current passing through the coil of wire magnetizes the ferromagnetic material and generates a magnetic field.

Feedback circuit: A circuit that samples a signal from another system and generates another signal to either send back to the system or to another source.

Ferrofluid: Any liquid capable of becoming magnetized in the presence of a magnetic field.

Ferromagnetic material: Any material intrinsically capable of responding to a magnetic field.

Field magnet: Any ferromagnetic material used to guide a magnetic field.

Folded flap (of a substrate): Any portion of the substrate that lies in a different angled plane from a central portion of the substrate.

Mechanically coupled: Any physical connection made between two or more elements.

Permanent magnet: Any material that creates its own persistent magnetic field.

Reservoir: Any material containing a liquid or other semi-solid material.

Signal: Any form of electrical, electromagnetic, or acoustic energy.

Structure: any material used to mechanically couple the substrate to another element.

Superconducting magnet: An electromagnet where the material of the coils has an extremely low resistivity when operated below the material's critical temperature.

Transducer: A device capable of receiving power in one form and outputting power in a different form.

DETAILED DESCRIPTION OF THE INVENTION

Although specific configurations and arrangements may be discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications beyond those specifically mentioned herein.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Certain examples of contemporary electromechanical transducers include a voice coil wrapped in circular coil shape around a magnetic core. This design is often employed within loudspeakers for causing the vibrations of the speaker cone or diaphragm. This configuration also provides the basis for many types of magnetically actuated linear motors. Examples of such conventional, circular coil transducer designs are illustrated in FIGS. 1A and 1B.

Figure 1B:
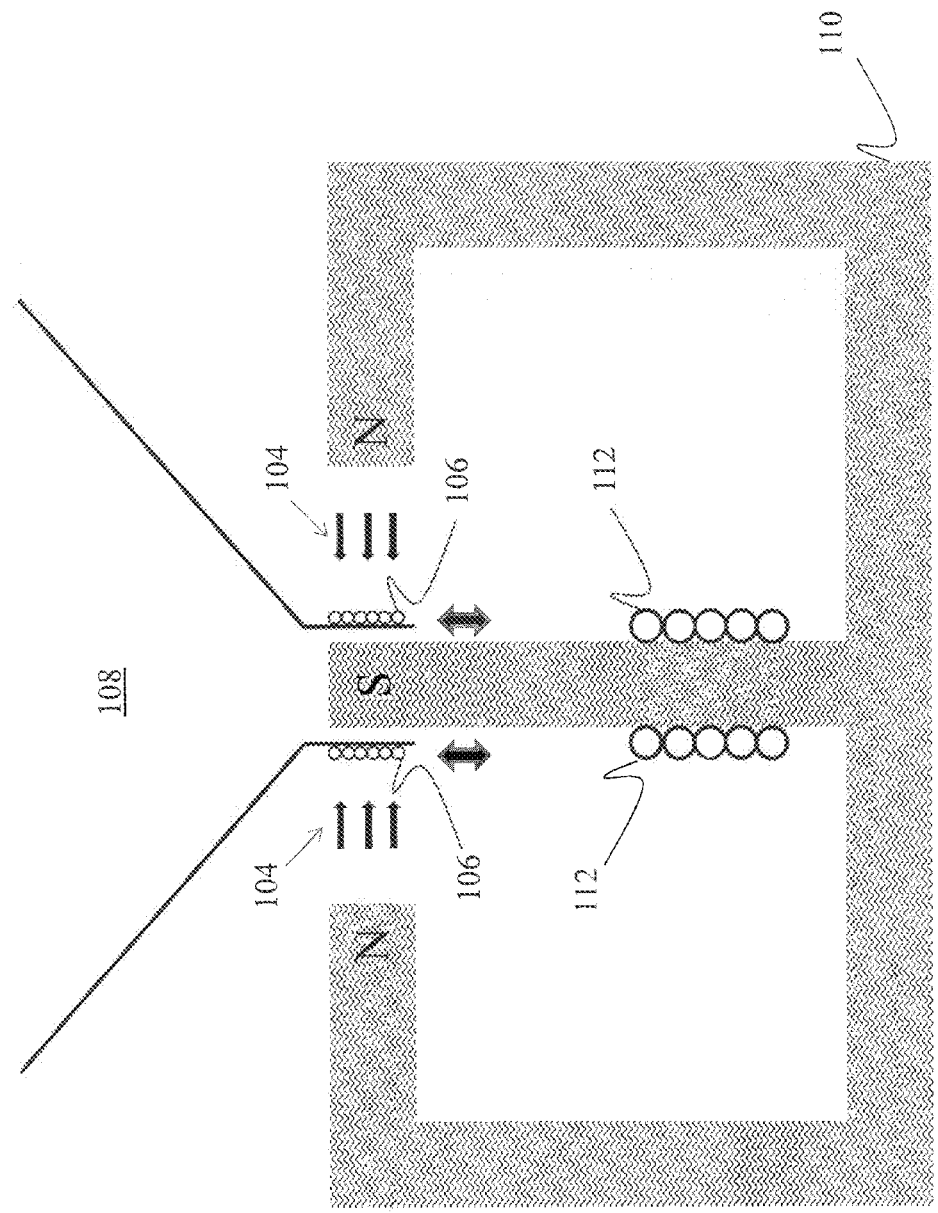

FIG. 1A illustrates a magnet 102 having labeled north and south poles with a magnetic field 104 existing between the poles. Magnetic field 104 is often referred to as magnetic flux when describing its use in electromagnetic circuits. The magnetic flux is the product between the magnetic field strength and the integrated surface through which the magnetic field passes. The term "flux path" may be used herein to generally describe the direction of the generated magnetic field as it travels between magnetic elements (permanent and ferromagnetic elements).

A voice coil 106 is illustrated being attached to a neck region of a cone structure 108. Voice coil 106 wraps around the south pole of magnet 102, such that the individual coils illustrated extend into and out of the page and connect around to one another. As such, a current applied through voice coil 106 would flow in opposite directions on either side of magnet 102. For example, current may flow into the page for the coils on the left side of magnet 102 while current flows out of the page for the coils on the right side of magnet 102.

In the example illustrated in FIG. 1A, magnet 102 is a permanent magnet with magnetic field 104 always present and strongest between the poles of magnet 102. By applying a current within voice coil 106, a Lorentz force is generated that acts in a vertical direction upon voice coil 106, as designated by the double ended arrows. Depending on the direction of the applied current, voice coil 106 can move up or down. The generated force is in a direction that is perpendicular to both the direction of the magnetic field 104 and the direction of the current within voice coil 106. An AC signal may be applied to the voice coil at a given frequency to produce a similar vibration frequency in the attached cone structure 108.

FIG. 1B illustrates many of the same features as the electromechanical transducer of FIG. 1A; however, magnet 110 of FIG. 1B is a ferromagnetic material having a drive coil 112. A current is applied through drive coil 112 to generate magnetic field 104 between the poles of the ferromagnetic material. The use of a current-carrying coil of wire wrapped around a ferromagnetic material creates an electromagnet. Permanent magnets typically generate stronger magnetic fields than electromagnets, but electromagnets tend to be less expensive.

The airgap that exists between the poles of magnet 102 or magnet 110 is connected in a circular region surrounding the south pole. As such, in these designs, there is a single voice coil placed within a single airgap.

As noted above, and used extensively herein, the term "magnet" is not intended to be limited to only permanent magnets. A ferromagnetic material such as, for example, iron, cobalt, or nickel, may itself be considered a magnet. These ferromagnetic materials may be used to generate a magnetic field when applying a current to a wire wrapped around them. Apparatus/circuits for generating such current are well known as would become apparent to persons having ordinary skill in the electrical arts. In another example, these ferromagnetic materials may be placed within the magnetic flux path to help guide the trajectory of the magnetic flux path.

An electromechanical transducer design that leverages the added force achieved from integrating multiple coils within multiple airgaps would be able to generate greater force with lower current amplitudes and/or reduced size depending on desired implementation requirements. According to embodiments of the present invention, FIGS. 2A-2C provide various views of an electromechanical transducer.

Figure 2A:
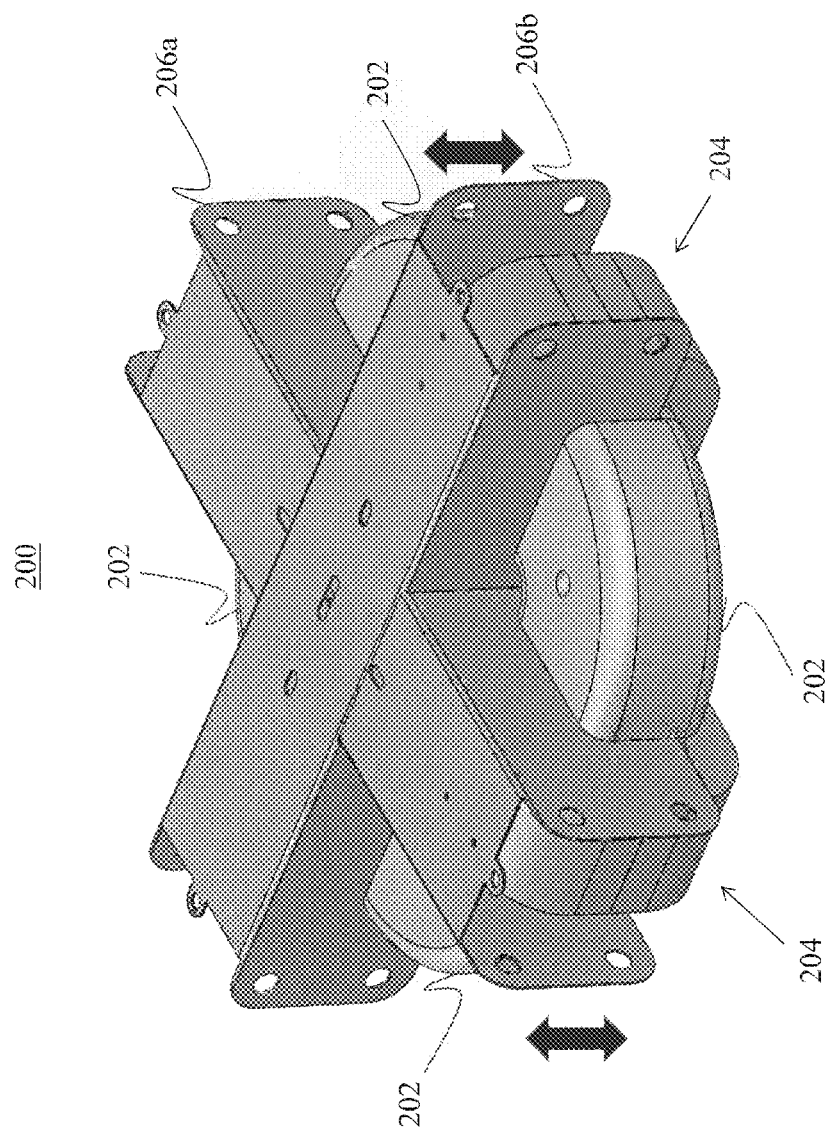
FIGS. 2A-2C illustrate various views of an electromechanical transducer, according to embodiments.
Figure 2B:
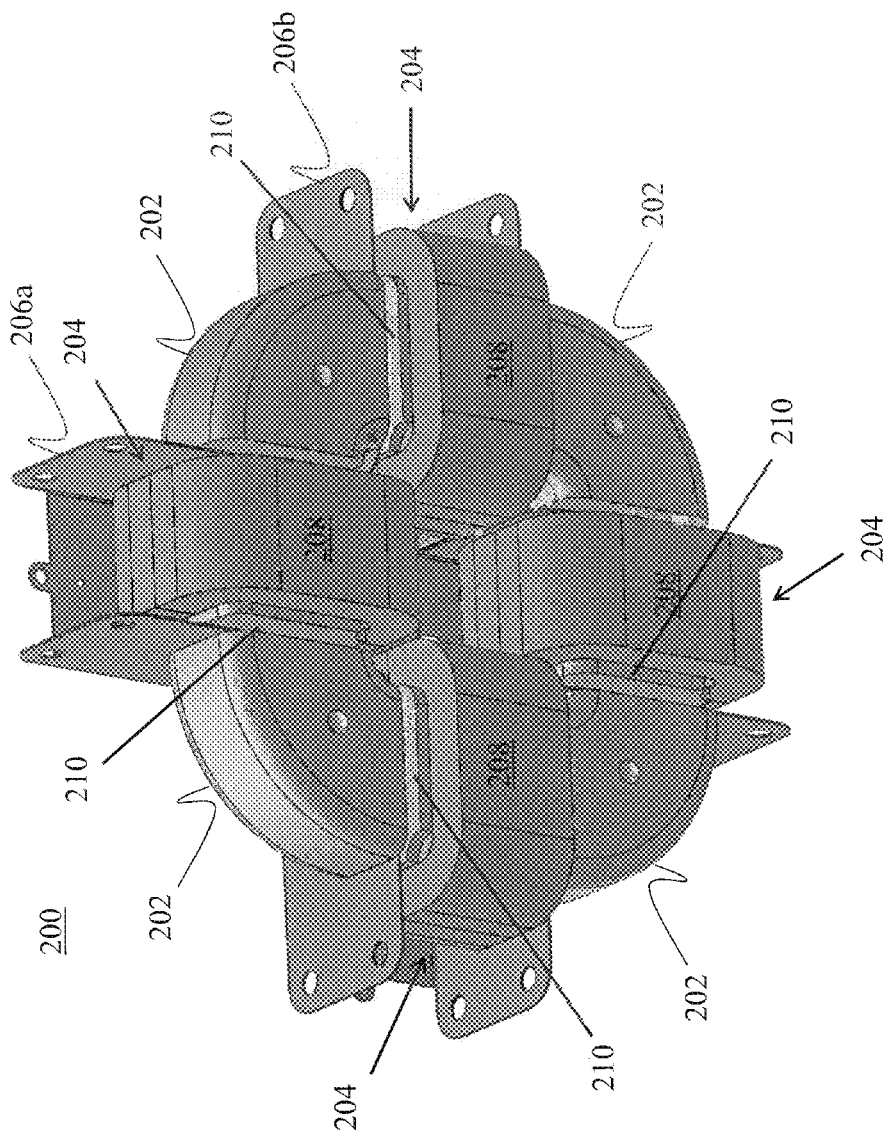
Figure 2C:
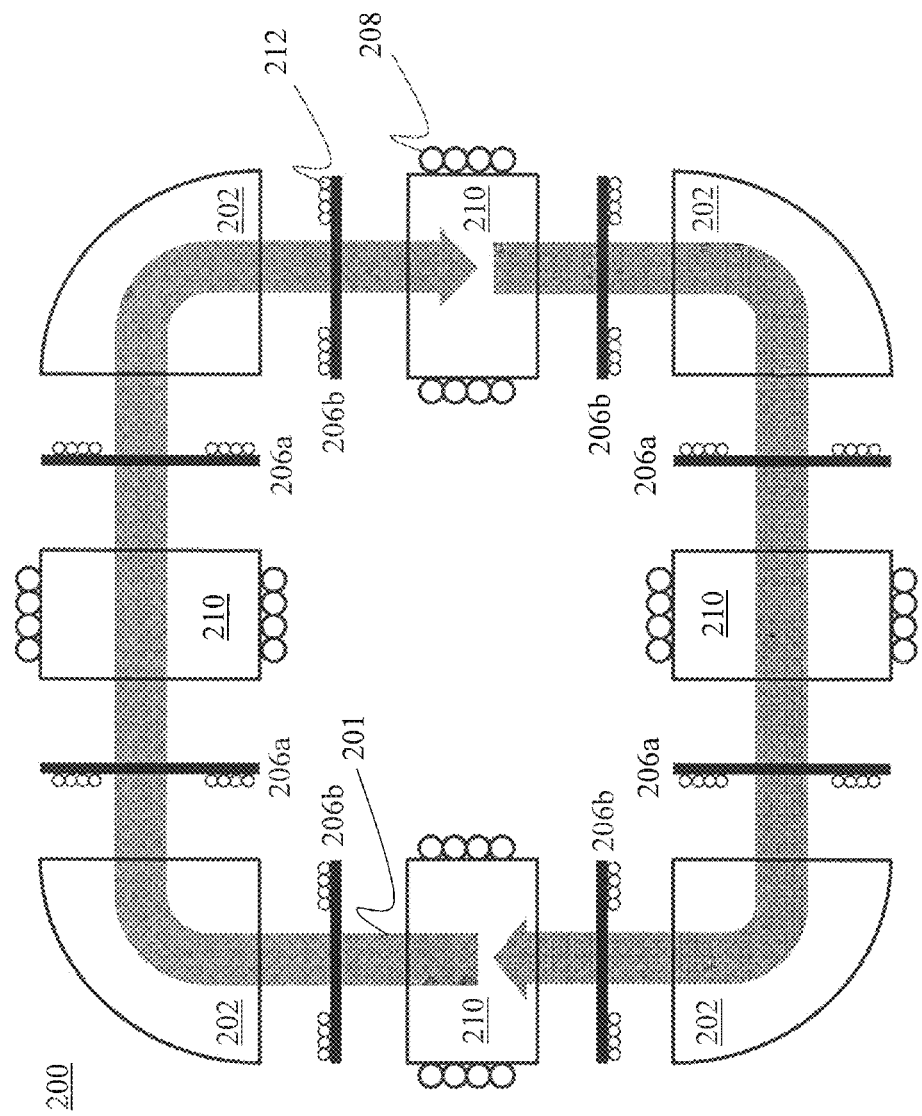

FIG. 2A illustrates a three dimensional perspective view of a transducer 200, according to an embodiment. Transducer 200 includes one or more field magnets 202, one or more drive magnets 204, a substrate 206a and another substrate 206b. Each of substrate 206a and substrate 206b includes a patterned conductive coil (e.g., that functions as a voice coil) located between adjacent magnets and in the path of the magnetic flux generated between the magnets. Both field magnets 202 and drive magnets 204 may collectively make up a single arrangement of magnets. Both field magnets 202 and drive magnets 204 may be arranged such that a continuous magnetic flux path passes between each of field magnets 202 and drive magnets 204. In the illustration of FIG. 2A, this continuous magnetic flux path may be directed in a circular pattern (i.e., moving clockwise or counter-clockwise) between each of field magnets 202 and drive magnets 204. Other arrangements of magnets are possible, only some of which are discussed herein below. The arrangement of magnets may take on a variety of closed shapes, such as a circular shape or a racetrack shape. The magnets may alternatively be arranged in any quadrilateral shape.

In one embodiment, drive magnets 204 generate a magnetic field while field magnets 202 guide the generated magnetic field between the other magnets in the arrangement. FIG. 2A and FIG. 2B illustrate such an embodiment where drive magnets 204 are electromagnets having a drive coil 208 wrapped around a ferromagnetic material 210. In this embodiment, field magnets 202 may also comprise a ferromagnetic material such as iron, cobalt, or nickel. However, the terms "drive magnets" and "field magnets" are merely labels for providing a more convenient way to describe the roles various magnets of the plurality of magnets can have. For example, drive magnets 204 may be permanent magnets, electromagnets, or a mixture of both. In this embodiment, field magnets 202 alternate with drive magnets 204.

It should be understood that the use of field magnets 202 is not required and that all magnets within transducer 200 may be drive magnets 204. In this embodiment, each magnet of the plurality of magnets may be an electromagnet or a permanent magnet, or combinations thereof. In another embodiment, each magnet of the plurality of magnets is either an electromagnet or a permanent magnet.

According to another embodiment, one or more drive magnets 204 or field magnets 202 is a superconducting magnet. Superconducting magnets are typically electromagnets used in very low temperatures such that the resistance of the drive coils is extremely low. The drive coils of a superconducting magnet may be manufactured from type II superconductors, such as niobium-titanium or niobium-tin, but other suitable superconducting materials may be used. Transducer 200 with superconducting magnets may find practical applications in extremely cold environments such as outer space.

With the magnetic flux path generated between the arrangement of drive magnets 204 and field magnets 202, a plurality of conductive coils are placed within airgaps between adjacent magnets in the arrangement. The conductive coils are patterned on substrates 206a and 206b, according to an embodiment. The patterned conductive coils are located on folded flaps of substrates 206a and 206b, and the folded flaps are inserted into the airgaps between adjacent magnets in the arrangement such that the magnetic flux path passes through at least a portion of the patterned conductive coils, according to an embodiment. By applying a current through the patterned conductive coils, while subjected to the generated magnetic field, an induced force will cause substrates 206a and 206b to move up or down as designated by the double ended arrows. The direction of the force depends on the direction of the flowing current in the patterned conductive coils as well as the direction of the generated magnetic field.

FIG. 2C provides a cut-away view through the middle of transducer 200, according to an embodiment. The airgaps between adjacent magnets in the arrangement have been exaggerated to illustrate how folded flaps of substrates 206a and 206b fit between the magnets. Conductive coils 212 having at least one turn are illustrated as being patterned upon substrates 206a and 206b. Note that FIG. 2C illustrates the "vertical" wires of conductive coils 212, and does not illustrate the "horizontal" wires of conductive coils 212. In order to provide a force in the direction shown by the double ended arrows of FIG. 2A, the continuous magnetic flux path 201 must pass through at least one of the horizontal wires of conductive coils 212. The vertical wires of conductive coils 212 will also generate a force, but the force will be in a lateral direction (90 degrees with respect to the force provided by the horizontal wires). In certain embodiments, transducer 200 may be modified to take advantage of the lateral forces generated by passing the magnetic field 201 through the vertical wires of conductive coils 212. Conductive coils 212 may be patterned on one side of substrates 206a and 206b as illustrated, or on both sides. In some embodiments, conductive coils 212 may extend through substrates 206a and 206b. In some embodiments, a ferrofluid 214 may be used to fill the airgaps between adjacent magnets. Ferrofluid 214 may aid in the containment and guidance of the continuous magnetic flux path 201 as it passes between adjacent magnets and through substrates 206a and 206b. Ferrofluid 214 may also aid in the dissipation of heat generated by any of conductive coils 212 or drive coil 208.

In the embodiment illustrated in FIGS. 2A-2C, transducer 200 includes two substrates 206a and 206b orientated substantially perpendicular from one another to provide multiple flaps to fit into multiple airgaps. In another embodiment, a single substrate may be used to extend into one, some, or all of the airgaps. Similarly, any number of substrates may be used to provide conductive coils within the airgaps without deviating from the scope or spirit of the invention.

Transducer 200 as illustrated in FIGS. 2A-2C may also be used as a sensor, according to an embodiment. For example, a current on conductive coils 212 may be induced due to a movement of substrates 206a and 206b. In this way, transducer 200 may act as a pressure sensor and generate a measurable current proportional to the amount of force acting upon substrates 206a and 206b. Microelectromechanical (MEMS) fabrication techniques may be utilized to design and build transducer 200 on a very small scale, thus improving its sensitivity when being used as a sensor.

Figure 3A:
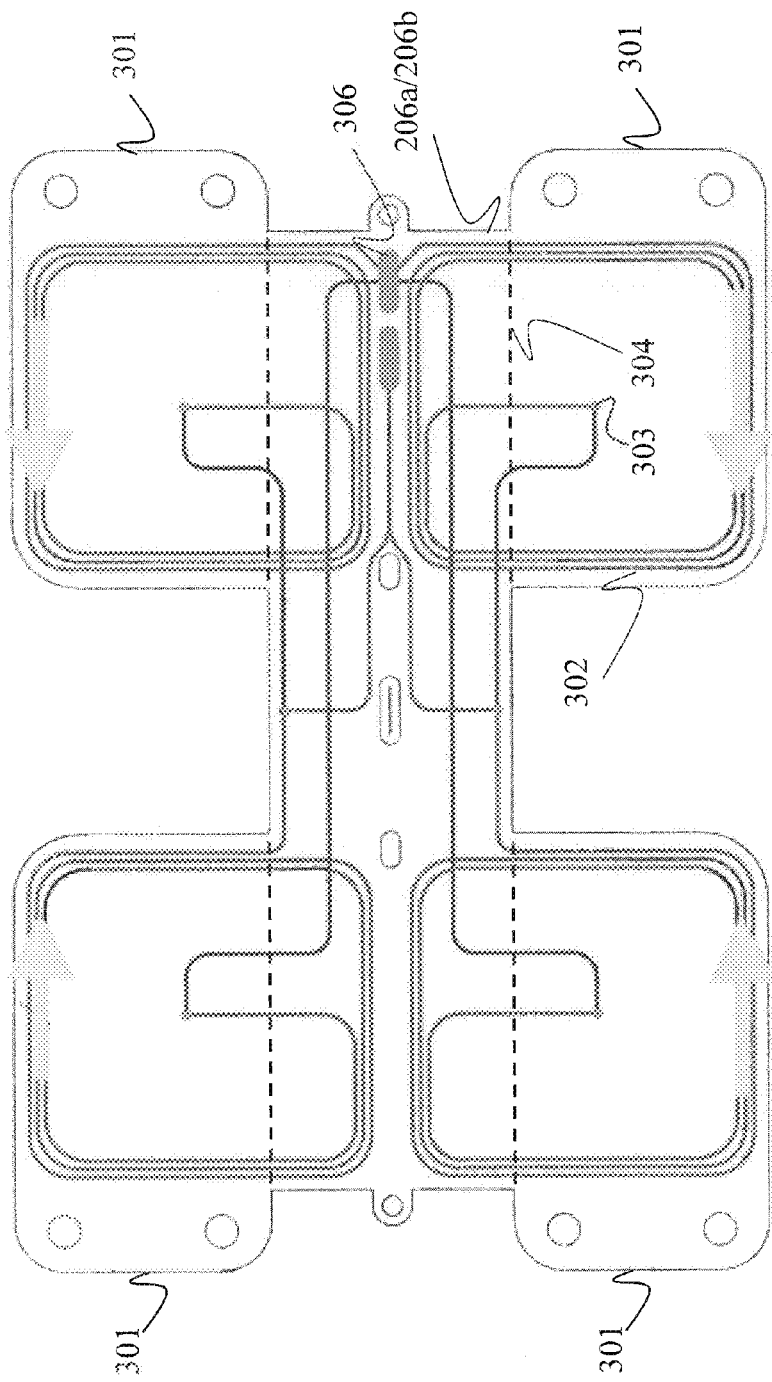
FIGS. 3A-3B illustrate example embodiments of substrates having patterned coils.

FIG. 3A illustrates an example of substrate 206a/206b, like the one illustrated from FIGS. 2A-2C. The dotted lines designate fold lines 304 for forming flaps 301, each flap 301 having a patterned conductive coil 302. In some examples, substrate 206a/206b bends rather than folds along fold lines 304. At least a portion of patterned conductive coil is located on flaps 301. In one embodiment, all of patterned conductive coil 302 is located on flaps 301. The conductive traces used to connect to patterned conductive coil 302 may be patterned on more than one layer of substrate 206a/206b such that the traces do not cross over and short together patterned conductive coil 302. The conductive traces may connect to one or more vias 303 to move between different layers of substrate 206a/206b. The conductive traces may be used to electrically connect patterned conductive coil 302 to a contact pad 306. In an embodiment, contact pad 306 may be used to make electrical connections to one or more other circuits and/or power sources located either within transducer 200 or external to transducer 200.

Figure 3B:
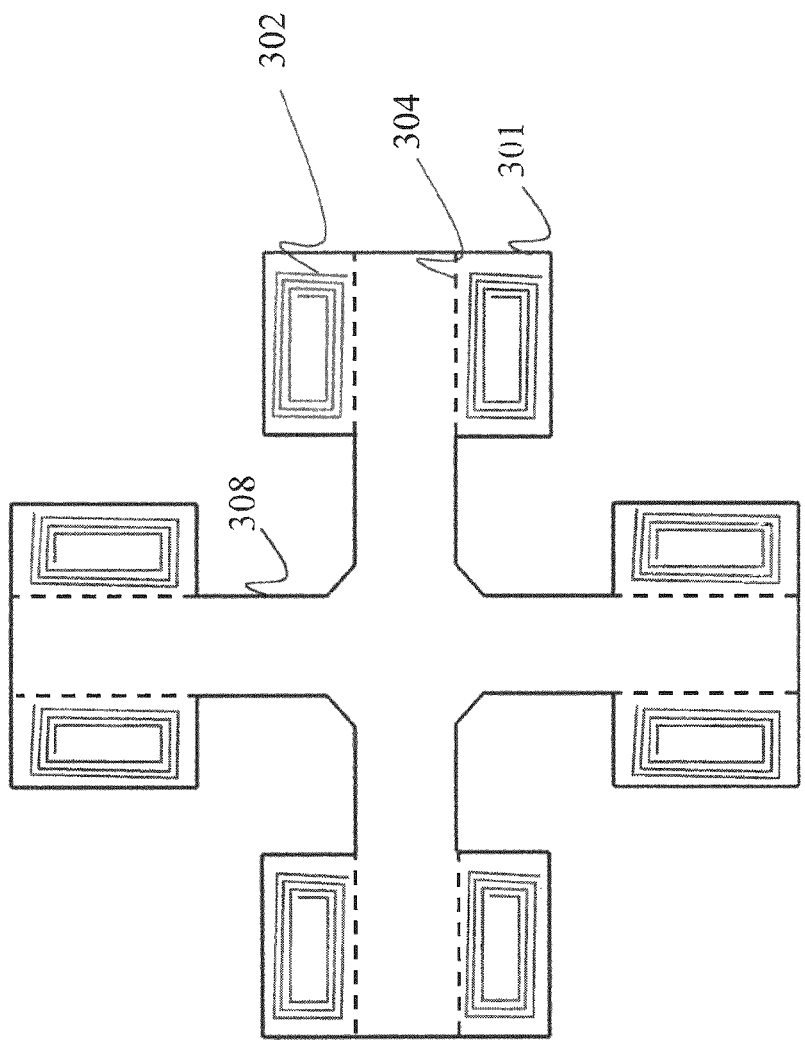

FIG. 3B illustrates another example of a substrate 308 that includes four arms, each arm having two flaps 301. The flaps are designed to fold (or bend) along fold lines 304. At least a portion of patterned conductive coil 302 is located on one or more of flaps 301. The use of a single substrate 308 as illustrated in FIG. 3B may be advantageous to reduce material cost. As noted previously, substrate 308 may have any number of arms with any number of flaps on each arm, simply depending on the arrangement of airgaps between the plurality of magnets.

Any of substrates 206a, 206b, and 308 may be a printed circuit board (PCB). Any substrate design beyond those specifically illustrated in the above embodiments may be provided on a PCB. The PCB may use suitable material layers such as FR-4 or any other similar materials. The substrate may be a flexible substrate comprising a polymer material.

Patterned conductive coil 302 may comprise a variety of conductive materials and may be deposed upon the substrate using a variety of methods. For example, patterned conductive coil 302 may include copper, gold, platinum, silver, or any alloy thereof. In another example, conductive coil 302 includes a conductive ink, such as a silver-based ink or a carbon-based ink. The ink may initially be patterned on the substrate as either a powder or a liquid and subsequently subjected to a curing process to form the solid pattern. In yet another example, conductive coil 302 includes a conductive polymer that may use organic materials such as polyacetylene or polypyrrole. In another example, the conductive polymer includes silicon rather than carbon. Other techniques for depositing the conductive material include imprint lithography, photolithography, and ink or laser jet printing.

In one embodiment, patterned conductive coil 302 includes a material with a conductivity that is highly dependent on the temperature. Although all materials exhibit some change in conductivity with a change in temperature, some materials may exhibit changes in conductivity on at least an order of magnitude for relatively small changes in temperature.

Figure 4:
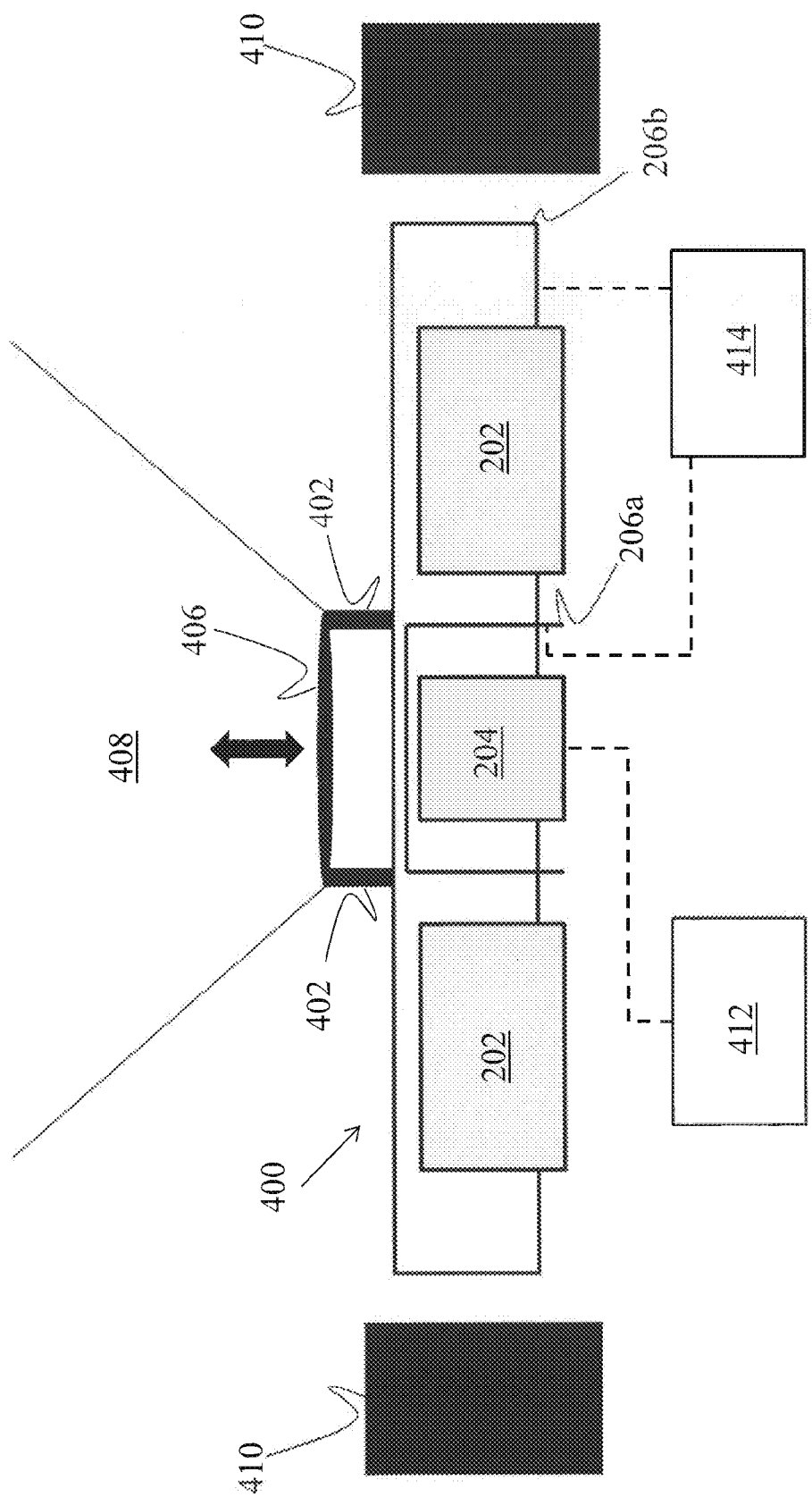
FIG. 4 illustrates a packaging arrangement for an electromechanical transducer, according to an embodiment.

FIG. 4 illustrates a side view of an electromechanical transducer 400 within a housing 410 and coupled to a diaphragm 406, according to an embodiment. Field magnets 202 and drive magnets 204 are illustrated in an alternating arraignment with substrates 206a and 206b providing the conductive coils within airgaps between the magnets, according to an embodiment. Housing 410 may be constructed to surround transducer 400 and protect transducer 400 from physical harm or the environment. For example, housing 410 may provide protection from humidity and contaminants in the surrounding air that may adversely affect the operation of transducer 400. Housing 410 may also maintain a stable temperature around transducer 400. Housing 410 may include a cooling circuit driven by an external mechanism (not shown) that may include gas or liquid cooling systems to regulate the temperature of electromechanical transducer 400.

According to an embodiment, substrates 206a and 206b are mechanically coupled to diaphragm 406 via a structure 402. Structure 402 may be the same material as either diaphragm 406 or substrates 206a and 206b. Structure 402 may be designed to provide mechanical coupling between diaphragm 406 and substrates 206a and 206b, such that a movement of substrates 206a and 206b will be transferred to diaphragm 406. Other embodiments may include diaphragm 408 being coupled directly to substrate 206a and/or substrate 206b. Diaphragm 406 may be any material that can vibrate due to the applied forces from substrates 206a and 206b. As can be seen in this embodiment, diaphragm 406 lies in a plane that is substantially perpendicular to the flaps of substrate 206a and 206b located within the airgaps between field magnets 202 and drive magnets 204.

In another embodiment, diaphragm 406 may be connected to a side of transducer 400 such that it lies in a plane that is substantially parallel to the flaps of substrate 206a and 206b located within the airgaps between field magnets 202 and drive magnets 204.

In a loudspeaker embodiment, diaphragm 406 may be coupled to a cone 408 to produce the desired sound. In other embodiments, diaphragm 406 may be replaced with a screen having a pore size for sifting. The screen may be used in mining applications or any other applications where quick and efficient separation of materials is desired.

One or more circuits 412 may be coupled to one or more driving coils (not shown) of drive magnets 204. One or more circuits 412 include components designed to generate a current through the driving coils, thereby producing a magnetic field directed between the arrangement of magnets. For example, such components may include power sources, transformers, transistors, capacitors, etc. A microcontroller or CPU may be included to control the functions of one or more circuits 412. However, in some embodiments, drive magnets 204 are permanent magnets, and thus one or more circuits 412 would not be required. One or more circuits 412 may be included within housing 410 or be provided external to housing 410.

One or more circuits 414 may be coupled to the conductive coils (not shown) patterned upon substrates 206a and 206b. One or more circuits 412 may include components designed to generate a current through the conductive coils. For example, such components may include power sources, transformers, transistors, capacitors, etc. A microcontroller or CPU may be included to control the functions of one or more circuits 414. One or more circuits 414 may include components designed to measure an induced current within the conductive coils due to a movement of substrates 206a and 206b. For example, such components may include resistors, operational amplifiers, capacitors, etc. One or more circuits 414 may be included within housing 410 or be provided external to housing 410.

In one embodiment, one or more circuits 414 includes a feedback circuit designed to measure a current from the conductive coils and output a signal based on the measured current. The signal may be output to another device or another set of circuits for further modulation or detection. For example, the signal may be output to a controller designed to monitor the signal and provide some output to a user. The signal may be output back to one or more of the conductive coils as a driving current to move substrates 206a and 206b. In another example, the signal may be used to affect the current applied to drive magnets 204 by one or more circuits 412. In this way, one or more circuits 414 may be operable to calibrate, monitor, and/or correct inherent imperfections in the response of transducer 400. Providing the signal as feedback to the conductive coils may also ensure that there is continuous military-grade consistency and reliability in the performance of transducer 400. One or more circuits 414 may be operable to shut down the applying of current to transducer 400 if one or more circuits 414 receives a measured current having one or more characteristics that are greater than or less than a given threshold. Some examples of signal characteristics include amplitude, frequency, phase, and rise time. By measuring the induced current, one or more circuits 414 may also be operable to determine the frequency response of transducer 400, and can detect any changes to its frequency response. Changes in the frequency response of transducer 400 may occur due to changes in mass due to bonding reactions of particular analytes of interest. By using one or more circuits 414 to actively monitor the vibrations being introduced by transducer 400, the system may be used in a wide array of applications ranging from the medical field (as a diagnostic tool) to civil engineering (testing structural integrity of bridges and buildings).

In another embodiment, one or more circuits 414 may apply currents to different conductive coils at different times. In this way, transducer 400 can generate forces in different areas and provide a non-uniform force distribution to diaphragm 406.

Figure 5A:
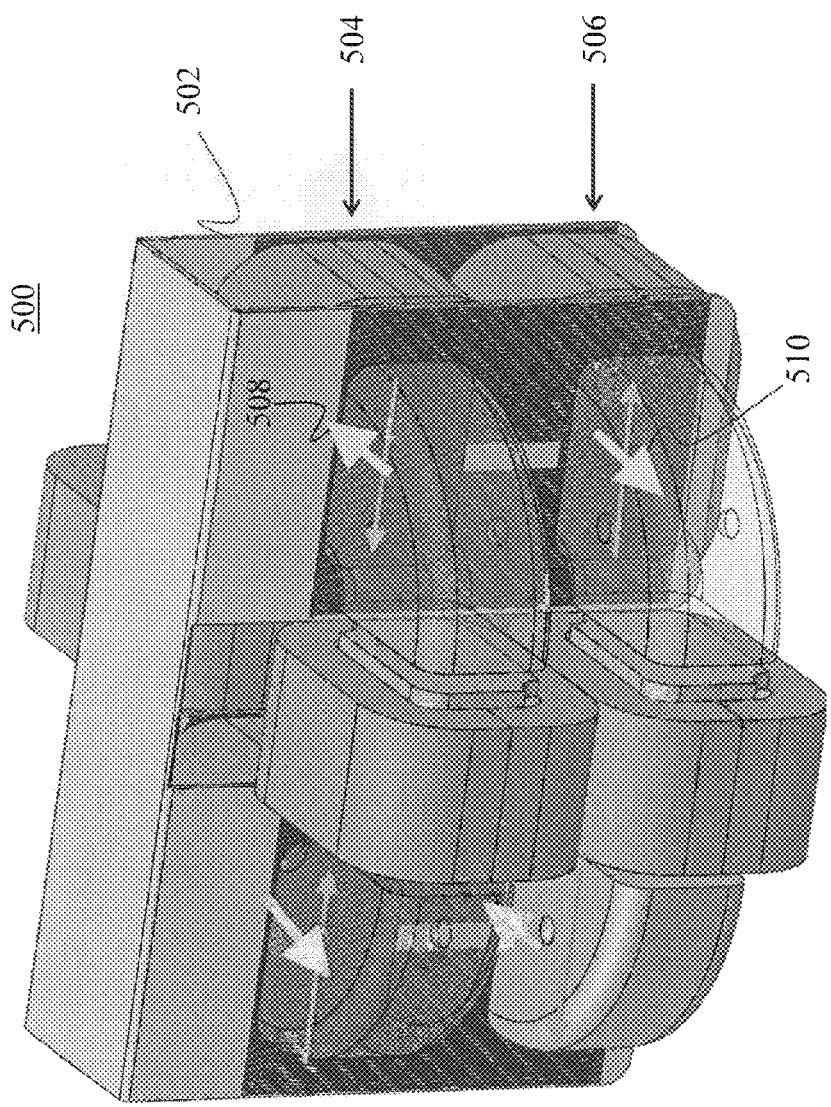
FIG. 5A illustrates an example embodiment of an electromechanical transducer.

FIG. 5A illustrates another embodiment of an electromechanical transducer 500. Transducer 500 includes a substrate 502 having folded flaps with conductive coils, and two layers of arranged magnets. A first layer 504 of magnets includes any combination of field magnets and/or drive magnets as discussed previously with reference to FIGS. 2A-2C. A second layer 506 of magnets also can include any combination of field magnets and/or drive magnets as discussed previously with reference to FIGS. 2A-2C. The arrangement of magnets in first layer 504 may be the same or different from the arrangement of magnets in second layer 506. It should also be understood that more than two layers of magnets could be used.

The folded flaps of substrate 502 extend within the airgaps formed between adjacent magnets in both layer 504 and layer 506. As such, the conductive coil present on the flaps is patterned such that it is subjected to a first continuous magnetic flux 508 and a second continuous magnetic flux 510. According to an embodiment, the magnets are arranged such that the first continuous magnetic flux 508 is directed in the opposite direction to the second continuous magnetic flux 510. This may be achieved by driving the coils of electromagnets with current flowing in one direction for the magnets of layer 504, and the current flowing in the opposite direction for the magnets of layer 506. In another example, permanent magnets with opposite polarity may be used between layers 504 and 506.

Figure 5B:
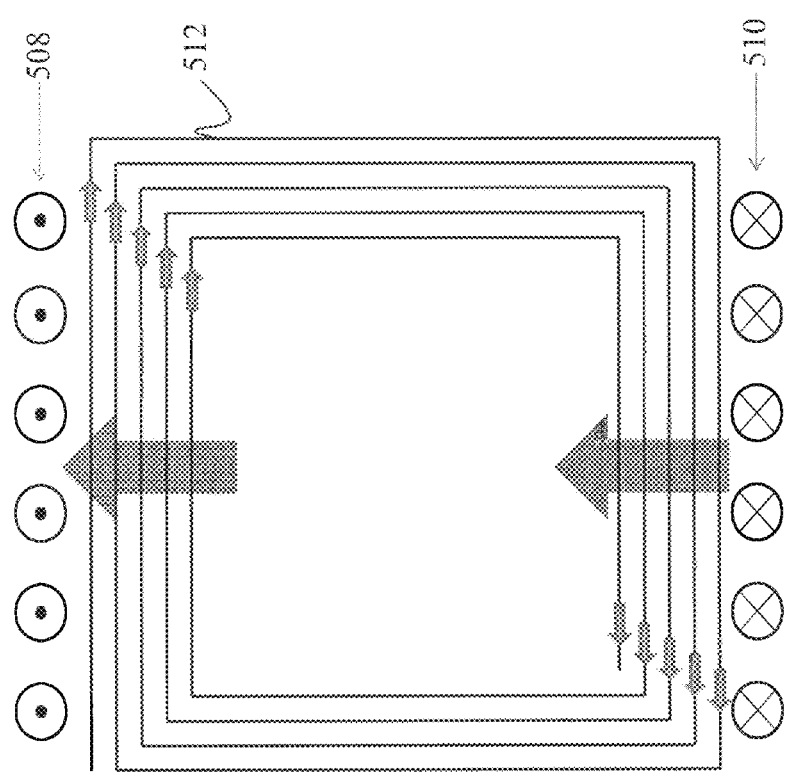
FIG. 5B illustrates the effects of a magnetic field on a current carrying wire, according to an embodiment.

Since the magnetic flux direction is opposite for the top portion of the conductive coil vs. the bottom portion of the conductive coil, the generated force will substantially be the sum of the force due to the top part of the conductive coil and the force due to the bottom part of the coil. This is shown schematically in FIG. 5B. A conductive coil 512 is subjected to magnetic flux 508 directed into the page along a top portion of the coil. Similarly, conductive coil 512 is subjected to magnetic flux 510 directed away from the page along a bottom portion of the coil. The smaller arrows designate the direction of current flowing in the coil while the larger arrows designate the direction of the induced force upon conductive coil 512. The induced force from both the top and bottom portion of conductive coil 512 is in the same direction.

Figure 6:
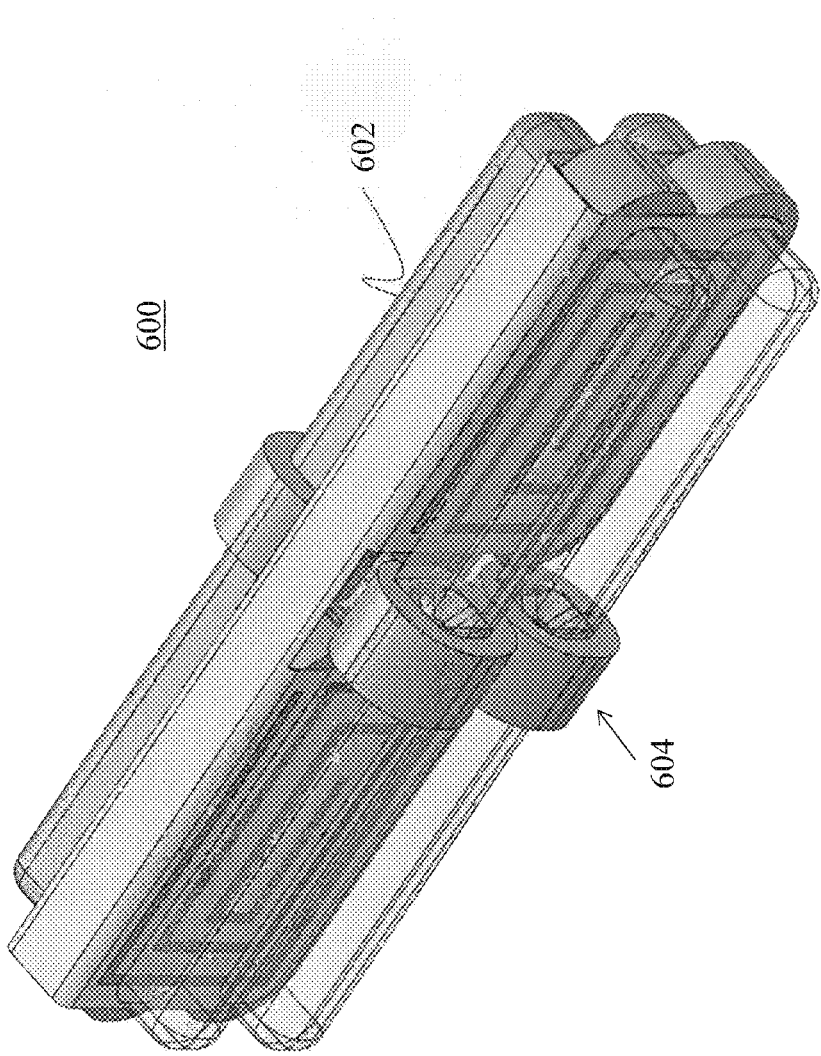
FIG. 6 illustrates an example embodiment of an electromechanical transducer.

FIG. 6 illustrates another embodiment of an electromechanical transducer 600. Field magnets 602 are elongated compared to drive magnets 604 and create an overall elongated shape to transducer 600. Any other shapes are possible to use as well without deviating from the spirit or scope of the invention.

Figure 7:
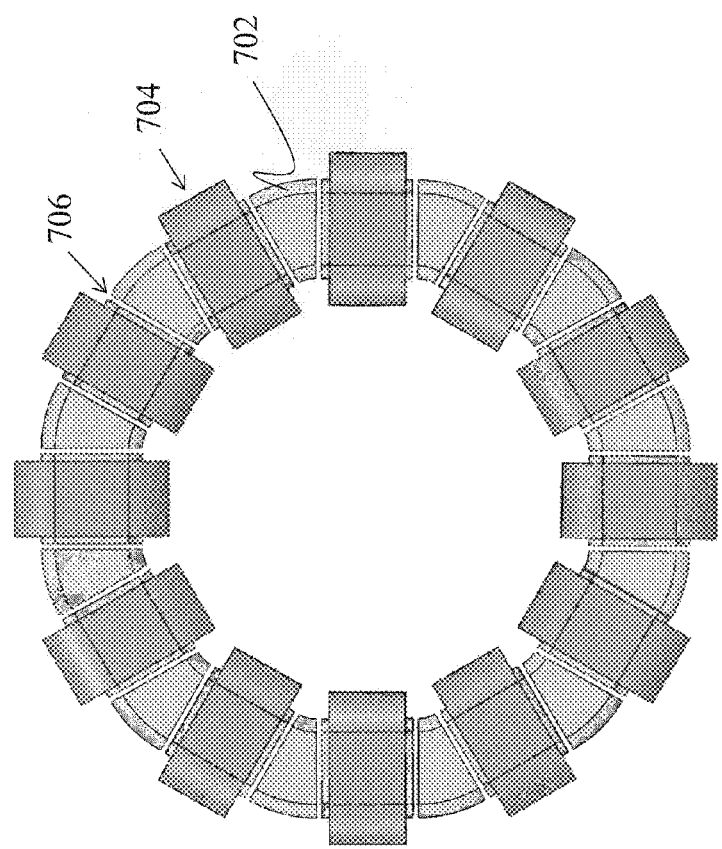
FIG. 7 illustrates an example embodiment of an electromechanical transducer.

FIG. 7 illustrates a larger arrangement of magnets to be used in an electromechanical transducer, according to an embodiment. The magnets are arranged in a closer circular shape, and thus would generate a continuous magnetic flux path that follows the same closed circular shape. Field magnets 702 alternate with drive magnets 704 (although other arrangements of magnets are possible as discussed previously). A plurality of airgaps 706 exist between adjacent magnets and provide space for inserting a conductive coil.

Figure 8:
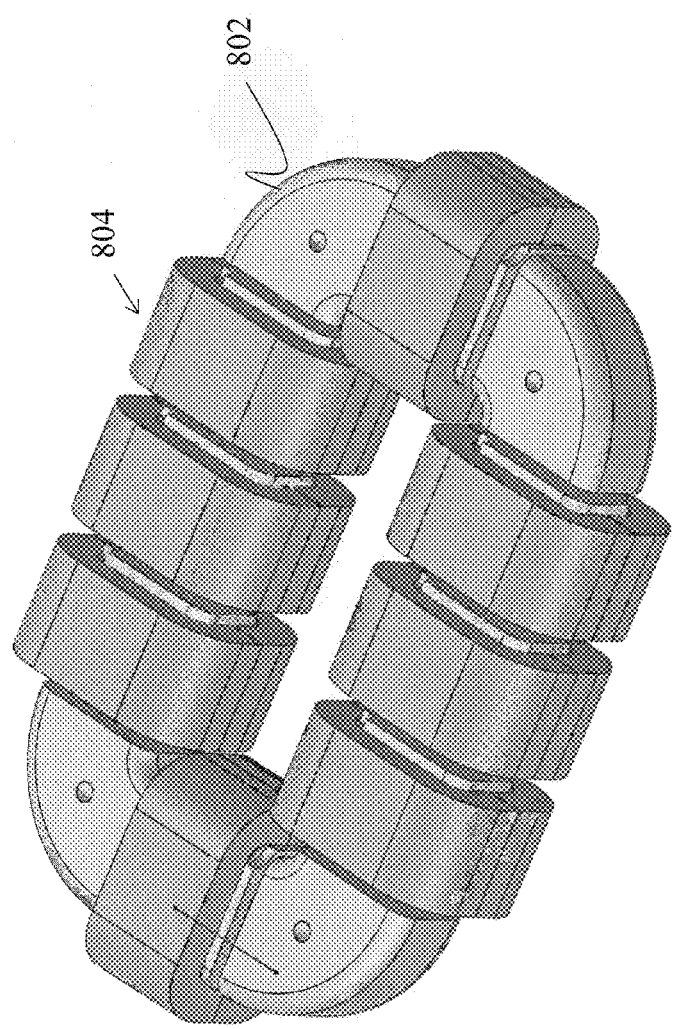
FIG. 8 illustrates an example embodiment of an electromechanical transducer.

FIG. 8 illustrates another arrangement of magnets to be used in an electromechanical transducer, according to an embodiment. The magnets are arranged in a closed racetrack shape, and thus would generate a continuous magnetic flux path that follows the same closed racetrack shape. Multiple drive magnets 804 are arranged sequentially while field magnets 802 are only used in the curved portions of the racetrack shape, according to an embodiment.

Figure 9A:
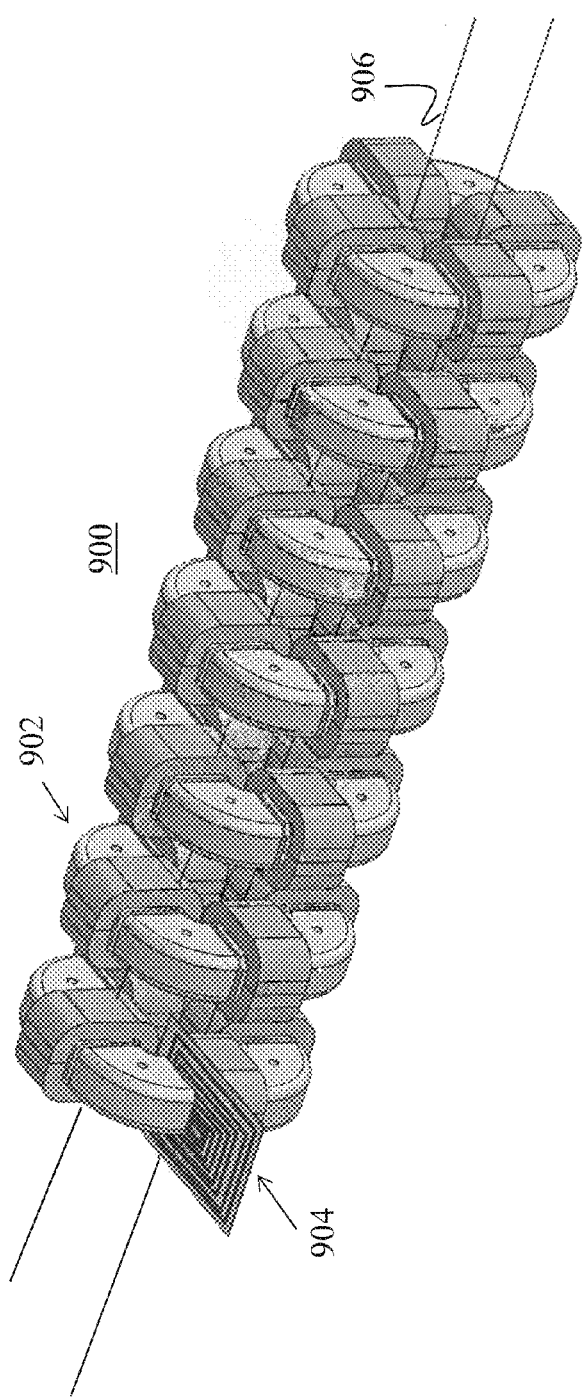
FIGS. 9A-9B illustrate different views of an electromechanical transducer, according to embodiments.

FIG. 9A illustrates a pump arrangement 900 that includes multiple stacked transducers 902, each transducer having one or more moveable substrates 904 with a patterned conductive coil, according to an embodiment. A reservoir 906 may be disposed within the middle of each of transducers 902. Reservoir 906 may hold a liquid or semi-solid material. By actuating one or more of the transducers 902 in a peristaltic manner, reservoir 906 may be compressed at various points along its length and the material within will be pumped through reservoir 906. The double-ended arrow indicates the direction of force that will be applied on substrate 904 due to the orientation of the wires in the conductive coil within the magnetic flux path.

Figure 9B:
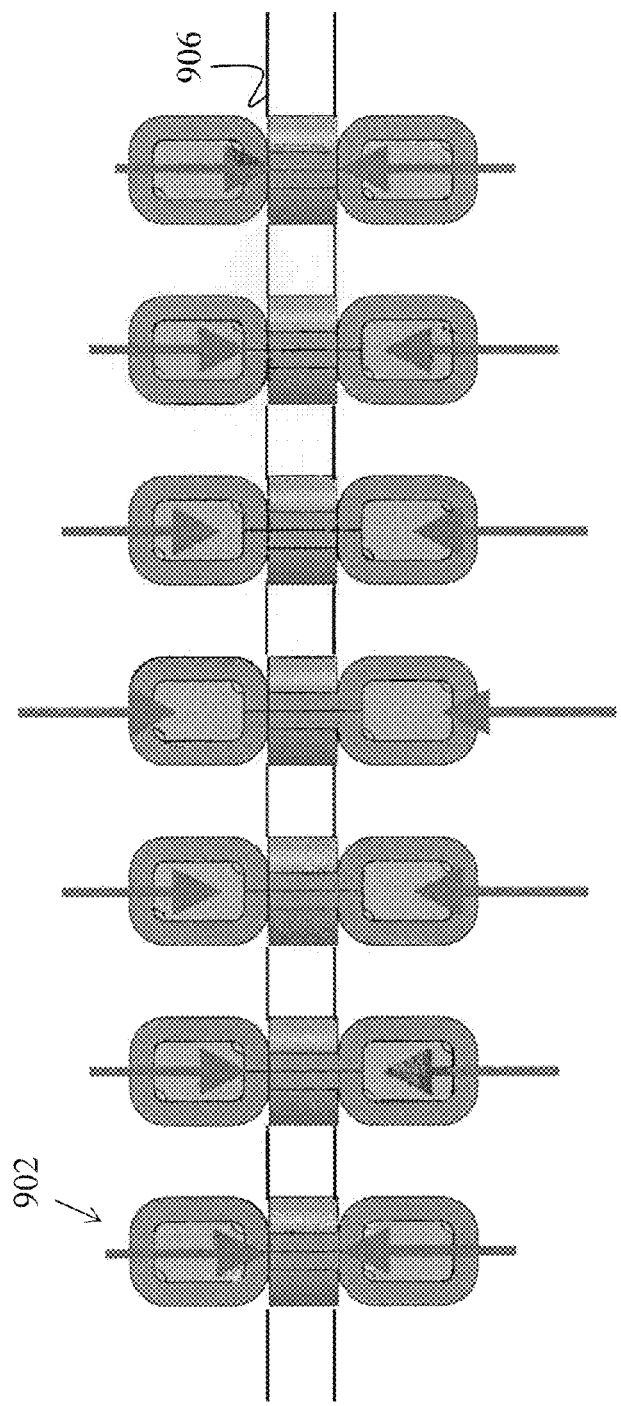

FIG. 9B illustrates an example of the peristaltic actuation to each of transducers 902 to pump the contents of reservoir 906 along its length. A controller (not shown) may be used to modulate the frequency and amplitude of the pumping.

Figure 10B:
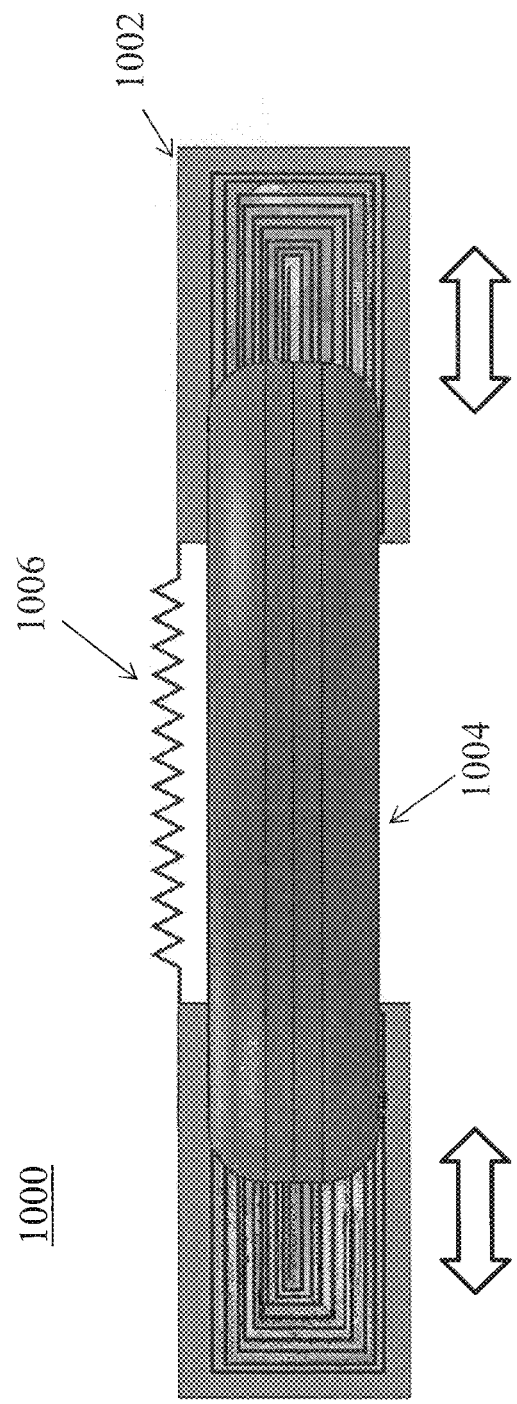

FIGS. 10A and 10B illustrate two different views of another embodiment of an electromechanical transducer 1000. Transducer 1000 includes a plurality of magnets 1004 in closed racetrack shape with substrates 1002 providing conductive coils within airgaps between adjacent magnets along the straight sides of the racetrack shape, according to an embodiment. The conductive coils are aligned between the adjacent magnets such that the induced force is in the direction shown by the double-ended arrows. The induced force is caused by a continuous magnetic flux path between the plurality of magnets.

According to an embodiment, one or more of substrates 1002 is coupled to a corrugated material 1006. Corrugated material 1006 lies in a plane substantially parallel to a direction of movement of the one or more substrates 1002. The applied force causes corrugated material 1006 to compress and relax like an accordion. FIG. 10B illustrates a side view of transducer 1000, according to an embodiment. Corrugated material 1006 is coupled to one or more substrates 1002 and is either compressed or relaxed depending on the movement of one or more substrates 1002. By modulating both the direction and amplitude of the current in the conductive coils on one or more substrates 1002, a vast array of actuation profiles can be generated for corrugated material 1006.

Figure 11:
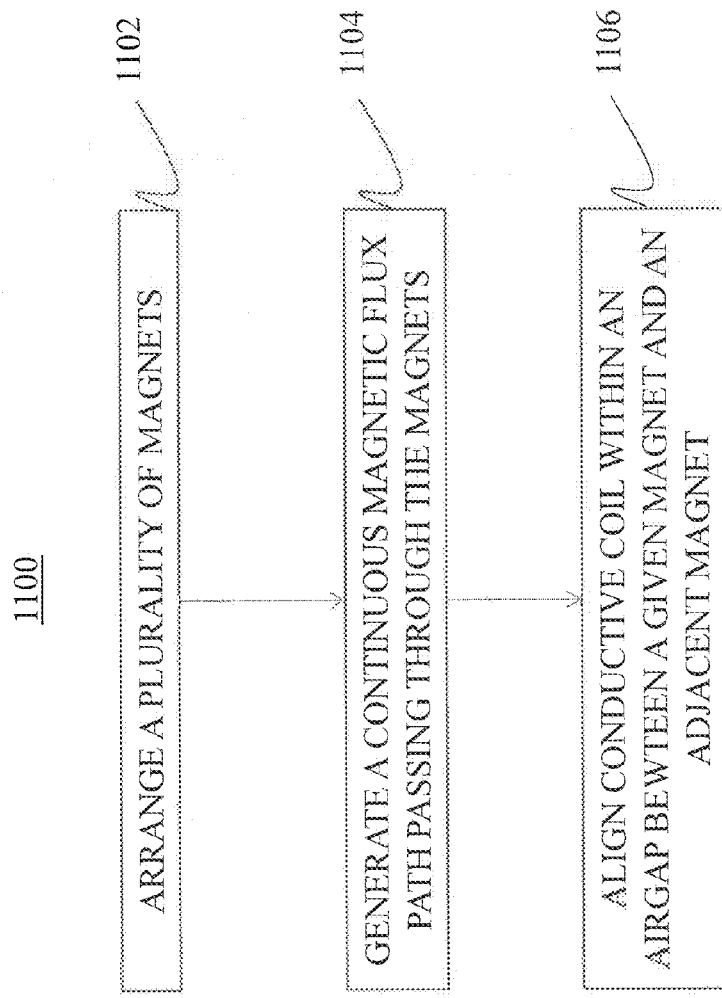
FIG. 11 illustrates an example method, according to an embodiment.

FIG. 11 illustrates and example method 1100, according to an embodiment. Method 1100 may be used to fabricate an electromechanical transducer, such as, for example, transducer 200. Method 1100 is not intended to be exhaustive and other steps may be performed without deviating from the scope or spirit of the invention.

Method 1100 begins with step 1102 where a plurality of magnets are arranged, according to an embodiment. The magnets may be arranged such that a continuous magnetic flux path passes through each of the plurality of magnets. The plurality of magnets may be arranged in any given shape. For example, the plurality of magnets may be arranged in a quadrilateral shape, a circular shape, or a racetrack shape.

The plurality of magnets may include various combinations of field magnets and drive magnets. The field magnets include a ferromagnetic material for guiding the magnetic field while the drive magnets generate the magnetic field. In one embodiment, drive magnets alternate with field magnets in the arrangement. Drive magnets may include permanent magnets and/or electromagnets.

In step 1104, a continuous magnetic flux path is generated and passes through each of the magnets, according to an embodiment. The continuous magnetic flux path may be generated by one or more permanent magnets, one or more electromagnets, or a combination of both. A current may be used to drive the one or more electromagnets and thus control the direction and magnitude of the continuous magnetic flux path.

In step 1106, a conductive coil is aligned within an airgap between a given magnet and an adjacent magnet of the plurality of magnets, according to an embodiment. The conductive coil may be patterned on a substrate that is aligned within the airgap. In one example, the conductive coil is patterned on one or more flaps of the substrate, and the flaps are disposed in one or more respective gaps. The conductive coil is aligned such that the continuous magnetic flux path passes through at least a portion of the conductive coil. The direction of the generated force can be controlled depending on which portion of the coil the continuous magnetic flux path passes through.

Other steps may be performed as part of method 1100. For example, the substrate may be mechanically coupled to a structure, which in turn is coupled to a diaphragm. The diaphragm is designed to vibrate based on a movement of the substrate. The diaphragm may be coupled such that it lies in a plane that is either substantially perpendicular or substantially parallel to the substrate within one or more of the airgaps. In place of the diaphragm, the structure may be coupled to a screen having a pore size. The screen may be vibrated to sift through materials placed on a top portion of the screen.

In some embodiments, a second plurality of magnets may be arranged such that a second continuous magnetic flux path, which passes through the second plurality of magnets, lies in a plane that is parallel to the first continuous magnetic flux path. Many stacks of magnet layers may be created in this way. Also, the second continuous magnetic flux path may be generated in a direction that is opposite to the first continuous magnetic flux path.

Figure 12:
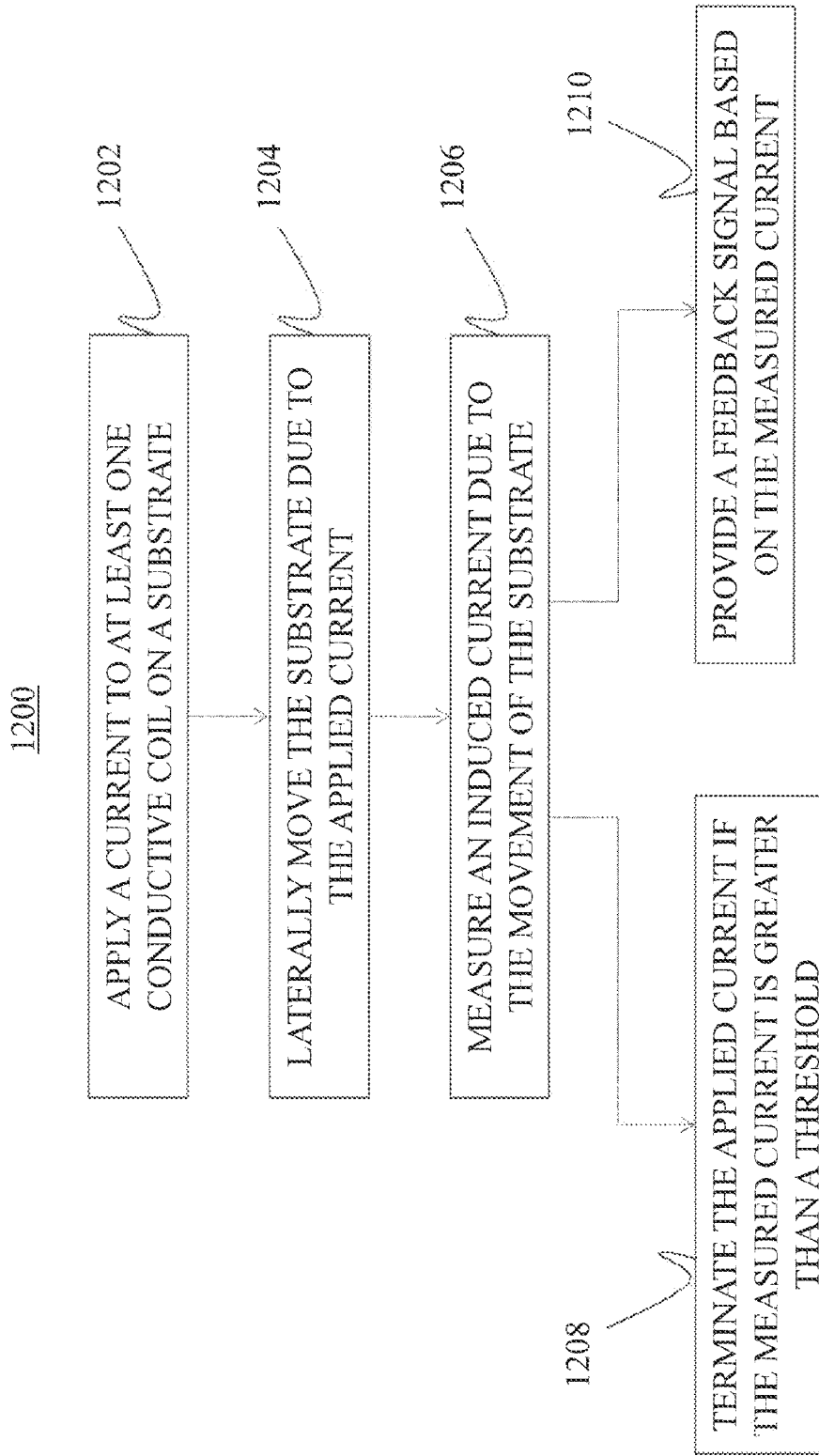
FIG. 12 illustrates an example method, according to an embodiment.

FIG. 12 illustrates and example method 1200, according to an embodiment. Various steps of method 1200 may be performed by one or more circuits coupled to an electromechanical transducer, such as, for example, transducer 200. Method 1200 is not intended to be exhaustive and other steps may be performed without deviating from the scope or spirit of the invention.

Method 1200 begins with step 1202 where a current is applied to at least one conductive coil. The conductive coil may be patterned on a substrate and disposed within one or more airgaps between adjacent magnets.

In step 1204, the substrate is moved laterally due to an induced force. The magnitude and direction of the induced force depend on both the direction and magnitude of the applied current as well as a magnetic field acting upon the conductive coil. The induced force may be only in a single direction for an applied DC current, or may cause the substrate to vibrate for an applied AC current.

In step 1206, an induced current is measured due to the movement of the substrate. The current may be induced upon one or more conductive coils patterned on the substrate moving through the magnetic field. The measured current may be used to provide an indication of how much the substrate moved due to the applied current from step 1202. The measured current may be stored as a data entry in a memory and/or may be used to perform a variety of actions.

Step 1208 illustrates an example action to perform based on the measured induced current from step 1206. In step 1208, one or more circuits may receive the induced current and be operable to terminate the applied current if the measured current has one or more characteristics that are greater than a given threshold. In another example, the applied current may be terminated if the measured current has one or more characteristics that are less than a given threshold. In this way, a transducer may be shut down if it begins to operate outside of safe parameters. Some examples of signal characteristics include amplitude, frequency, phase, and rise time.

Step 1210 illustrates another example action to perform based on the measured induced current from step 1206. In step 1210, a feedback signal is generated based on the measured induced current. This feedback signal may be used to affect the current being applied to the one or more conductive coils. In this way, a closed feedback loop may be created where the transducer is able to self-calibrate to a desired frequency response. The feedback signal may also be provided to another device or circuit for purposes of monitoring or user interaction. For example, the feedback signal may be used to provide an output for a user if one or more characteristics of the feedback signal is greater than or less than a given threshold.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An electromechanical transducer comprising:
    a plurality of magnets, wherein the plurality of magnets are arranged such that a continuous magnetic flux path passes through each of the plurality of magnets, and wherein the plurality of magnets include one or more electromagnets or permanent magnets arranged to alternate with one or more magnets comprising a ferromagnetic material; and
    a substrate comprising a patterned conductive coil of at least one turn, the substrate being disposed within an airgap between a given magnet of the plurality of magnets and an adjacent magnet of the plurality of magnets such that the continuous magnetic flux path passes through at least a portion of the patterned conductive coil.

2. The electromechanical transducer of claim 1, wherein the plurality of magnets are arranged in a quadrilateral shape.

3. The electromechanical transducer of claim 1, wherein the substrate is a printed circuit board (PCB).

4. The electromechanical transducer of claim 1, wherein the substrate includes a folded flap having at least a portion of the patterned conductive coil on it, and wherein the folded flap is located within the airgap.

5. The electromechanical transducer of claim 1, wherein the substrate includes a plurality of folded flaps, each of the folded flaps including a patterned conductive coil of at least one turn, and wherein each of the plurality of folded flaps is located within a respective airgap between a given magnet and an adjacent magnet of the plurality of magnets.

6. The electromechanical transducer of claim 1, further comprising:
    a structure, wherein the substrate is coupled to the structure; and
    a diaphragm coupled to the structure.

7. The electromechanical transducer of claim 1, further comprising a second substrate arranged substantially perpendicular to the substrate, the second substrate having one or more flaps disposed in one or more airgaps such that the continuous magnetic flux path passes through at least a portion of another patterned conductive coil patterned on the one or more flaps.

8. The electromechanical transducer of claim 1, further comprising one or more circuits configured to supply a current to the patterned conductive coil.

9. The electromechanical transducer of claim 1, further comprising one or more circuits configured to measure an induced current on the patterned conductive coil due to a movement of the substrate.

10. The electromechanical transducer of claim 1, further comprising one or more feedback circuits configured to receive the induced current and output a signal.

11. The electromechanical transducer of claim 10, wherein the one or more feedback circuits is configured to affect a current being applied to the patterned conductive coil.

12. The electromechanical transducer of claim 10, wherein the one or more feedback circuits is configured to output the signal to a controller configured to monitor the signal and provide an output signal.

13. An electromechanical transducer comprising:
    a plurality of magnets, wherein the plurality of magnets are spaced such that an airgap exists between adjacent ones of the plurality of magnets, and wherein the plurality of magnets include one or more electromagnets or permanent magnets arranged to alternate with one or more magnets comprising a ferromagnetic material;
    a substrate comprising a patterned conductive coil of at least one turn, the substrate being disposed within the airgap; and
    a diaphragm mechanically coupled to the substrate, wherein the diaphragm lies in a plane that is substantially perpendicular to the substrate disposed within the airgap.

14. The electromechanical transducer of claim 13, wherein the plurality of magnets are arranged such that a continuous magnetic flux path passes through each of the plurality of magnets.

15. The electromechanical transducer of claim 14, wherein the plurality of magnets are arranged in a quadrilateral shape.

16. An electromechanical transducer comprising:
    a first plurality of magnets spaced such that a first airgap exists between adjacent ones of the first plurality of magnets, and arranged such that a first continuous magnetic flux path passes through each of the first plurality of magnets;
    a second plurality of magnets spaced such that a second airgap exists between adjacent ones of the second plurality of magnets, and arranged such that a second continuous magnetic flux path passes through each of the second plurality of magnets;
    a substrate comprising a patterned conductive coil of at least one turn, the substrate being disposed within the first airgap and the second airgap, such that the patterned conductive coil is disposed within the first airgap and the second airgap;
    a diaphragm mechanically coupled to the substrate, wherein the diaphragm lies in a plane that is substantially perpendicular to the substrate disposed within the airgap.

17. The electromechanical transducer of claim 16, wherein the second plurality of magnets are configured such that a direction of the second continuous magnetic flux path runs opposite to a direction of the first continuous magnetic flux path.

18. The electromechanical transducer of claim 13, wherein the substrate is a printed circuit board (PCB).

19. The electromechanical transducer of claim 13, wherein the substrate includes at least one folded flap having at least a portion of a patterned conductive coil on it, and wherein the at least one folded flap is located within a respective airgap of a plurality of airgaps.

20. The electromechanical transducer of claim 13, further comprising a structure and a housing, wherein the substrate is coupled to the structure, and wherein the diaphragm is coupled to the substrate via the structure.

21. The electromechanical transducer of claim 13, further comprising a second substrate arranged substantially perpendicular to the substrate, the second substrate having one or more flaps disposed in one or more airgaps.

22. The electromechanical transducer of claim 13, further comprising one or more circuits configured to supply a current to the patterned conductive coil.

23. The electromechanical transducer of claim 13, further comprising one or more circuits configured to measure an induced current on the patterned conductive coil due to a movement of the substrate.

24. The electromechanical transducer of claim 13, further comprising one or more feedback circuits configured to receive the induced current and output a signal.

25. The electromechanical transducer of claim 24, wherein the one or more feedback circuits is configured to affect a current being applied to the patterned conductive coil.

26. A method comprising:
- arranging a plurality of magnets such that one or more electromagnets or permanent magnets of the plurality of magnets alternate with one or more magnets of the plurality of magnets comprising a ferromagnetic material, and such that an airgap exists between a given magnet and an adjacent magnet of the plurality of magnets;
- generating a continuous magnetic flux path that passes through each of the plurality of magnets; and
- aligning one or more conductive coils patterned on a substrate within respective airgaps such that the continuous magnetic flux path passes through at least a portion of the one or more conductive coils.

* * * * *